United States Patent
Lam et al.

(10) Patent No.: US 8,588,571 B1
(45) Date of Patent: Nov. 19, 2013

(54) INSTALLATION OF FIBER-TO-THE-PREMISE USING OPTICAL DEMARCATION DEVICES

(75) Inventors: Cedric F. Lam, Milpitas, CA (US); James F. Kelly, Milpitas, CA (US)

(73) Assignee: Google Inc., Mountain View, CA (US)

( * ) Notice: Subject to any disclaimer, the term of this patent is extended or adjusted under 35 U.S.C. 154(b) by 457 days.

(21) Appl. No.: 12/941,766

(22) Filed: Nov. 8, 2010

(51) Int. Cl.
*G02B 6/00* (2006.01)

(52) U.S. Cl.
USPC .......................................................... 385/135

(58) Field of Classification Search
USPC .......................................................... 385/135
See application file for complete search history.

(56) References Cited

U.S. PATENT DOCUMENTS

| | | | |
|---|---|---|---|
| 5,218,664 A * | 6/1993 | O'Neill et al. ................ | 385/135 |
| 5,699,176 A * | 12/1997 | Cohen ............................ | 398/66 |
| 5,926,298 A | 7/1999 | Li | |
| 6,009,220 A * | 12/1999 | Chan et al. ....................... | 385/24 |
| 6,434,313 B1 * | 8/2002 | Clapp et al. .................... | 385/135 |
| 6,778,752 B2 * | 8/2004 | Laporte et al. ................ | 385/135 |
| 7,206,482 B2 * | 4/2007 | Rhyne et al. .................. | 385/113 |
| 7,936,962 B2 * | 5/2011 | Mudd et al. ................... | 385/135 |
| 8,320,760 B1 | 11/2012 | Lam et al. | |
| 2002/0145775 A1 | 10/2002 | Effenberger et al. | |
| 2005/0207711 A1 * | 9/2005 | Vo et al. ........................... | 385/94 |
| 2006/0153565 A1 | 7/2006 | Park et al. | |
| 2006/0257148 A1 | 11/2006 | Hirth et al. | |
| 2007/0206898 A1 | 9/2007 | Wang et al. | |
| 2008/0267627 A1 | 10/2008 | Effenberger | |
| 2009/0060521 A1 | 3/2009 | Lin et al. | |
| 2009/0202246 A1 | 8/2009 | Kashima | |
| 2009/0263122 A1 | 10/2009 | Helkey et al. | |
| 2010/0054740 A1 | 3/2010 | Lee et al. | |
| 2010/0142955 A1 | 6/2010 | Yu et al. | |
| 2010/0196011 A1 | 8/2010 | Liu et al. | |

(Continued)

FOREIGN PATENT DOCUMENTS

EP        2 091 166 A1       8/2009

OTHER PUBLICATIONS

"Optical Network Management System, Remote Testing, Network Monitoring, and Service Provisioning Solution for High-Quality Network Performance", Retrieved from the internet: <http://www.jdsu.com/ProductLiterature/onms_br_fop_tm_ae.pdf>, 2005, 8 pages, JDSU Uniphase Corporation.

(Continued)

*Primary Examiner* — Charlie Peng
*Assistant Examiner* — Mary El Shammaa
(74) *Attorney, Agent, or Firm* — Blakely Sokoloff Taylor & Zafman LLP

(57) ABSTRACT

A technique for installing a fiber optic network includes preparing a physical site to install a feeder cable and a plurality of access stub lines along a plurality of customer premises that potentially may connect to the feeder cable to obtain communication services. Each of the access stub lines extends from the feeder cable towards a customer premise and each ends at a different initial termination point. There is a one-to-one correspondence between the customer premises and the access stub lines extending from the feeder cable. A demarcation device is attached to an end of each of the access stub lines at each of the initial termination points. The demarcation device includes an optical reflector that is reflective to an optical test signal for testing integrity of the feeder cable and an associated one of the access stub lines.

21 Claims, 7 Drawing Sheets

(56) References Cited

U.S. PATENT DOCUMENTS

| | | |
|---|---|---|
| 2010/0290782 A1 | 11/2010 | Lee et al. |
| 2011/0182578 A1 | 7/2011 | Cavaliere |
| 2011/0236017 A1 | 9/2011 | Ohlen |
| 2011/0243552 A1 | 10/2011 | Mitchell et al. |
| 2011/0262131 A1 | 10/2011 | Gottwald et al. |
| 2011/0268438 A1 | 11/2011 | Daems |
| 2011/0274433 A1 | 11/2011 | Presi et al. |

OTHER PUBLICATIONS

NetCracker, "Comprehensive Telecom Operations and Management Solutions, Product Overview", 2010, 2 pages, NetCracker Technology Corp.

"ONMS PON Centralized Remote PON Test System", <http://www.jdsu.com/product-literature/onmspon_br_fop_tm_ae.pdf>, Jun. 2009, 4 pages, JDSU Uniphase Corporation.

Hamacher, M. et al., "Coherent Receiver Front-End Module Including a Polarization Diversity Waveguide OIC and a High-Speed InGaAs Twin-Dual p-i-n Photodiode OEIC Both Based on InP," IEEE Photonics Technology Letters, vol. 4, No. 11, Nov. 1992, pp. 1234-1237.

"Homodyne detection", From Wikipedia, the free encyclopedia, <http://en.wikipedia.org/wiki/Homodyne_detection> retrieved from Internet on Jul. 11, 2011, 1 page.

Optical heterodyne detection, From Wikipedia, the free encyclopedia, <http://en.wikipedia.org/wiki/Optical_heterodyne_detection> retrieved from Internet on Jul. 11, 2011, 5 pages.

* cited by examiner

INSTALLATION OF FIBER-TO-THE-PREMISE USING OPTICAL DEMARCATION DEVICES

TECHNICAL FIELD

This disclosure relates generally to fiber optic networks, and in particular but not exclusively, relates to the installation and build out of fiber optic networks.

BACKGROUND INFORMATION

Fiber networks can be used to transport light that is modulated to carry information and to deliver communication services in various configurations, including broadband fiber-to-the-premise ("FTTP") communication services. In order to promote widespread deployment of FTTP broadband infrastructure, it is desirable to reduce the cost of fiber plant construction, which consists of as much as 80% of the total cost for FTTP deployments and is dominated by labor costs in developed countries. Techniques that can reduce this upfront expense associated with the initial fiber plant can further this goal. However, ongoing operation and maintenance expenses associated with the fiber plant also impact the adoption rate of FTTP communication services. One such expense is the detection and location of fiber faults (e.g., a fiber cut or breakage) that interrupt communication services. Such detection is necessary for repairing the broken fiber link and restoring the communication services. Techniques that can quickly and efficiently detect and locate these faults reduce the operation and maintenance expenses and further encourage adoption of FTTP communication services. In addition, these techniques shorten service outage time and improve user experiences.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus and method for installing a fiber optic network are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Fiber-to-the-Premise (FTTP) is the ultimate future-proof broadband access network infrastructure, which is essential for long-term economic growth. However, FTTP deployment is so capital intensive that many broadband access infrastructure providers are feverishly looking for methods to lower the deployment cost and the ensuing operating cost. Self-installation of the last segment of fiber connecting an end-user household to an operator's network is a possibility to significantly lower the cost of FTTP infrastructure deployment. At the same time, a good fiber plant demarcation strategy can help operators to efficiently localize and identify the area of responsibility in a system fault and service loss situations, hence reduce the long term operational costs. Embodiments disclosed herein discuss a strategy to install a fiber demarcation device for self-installed last segment deployment. Of course, this demarcation device can also be used when the operator performs the installation for the customer.

Figure 1:
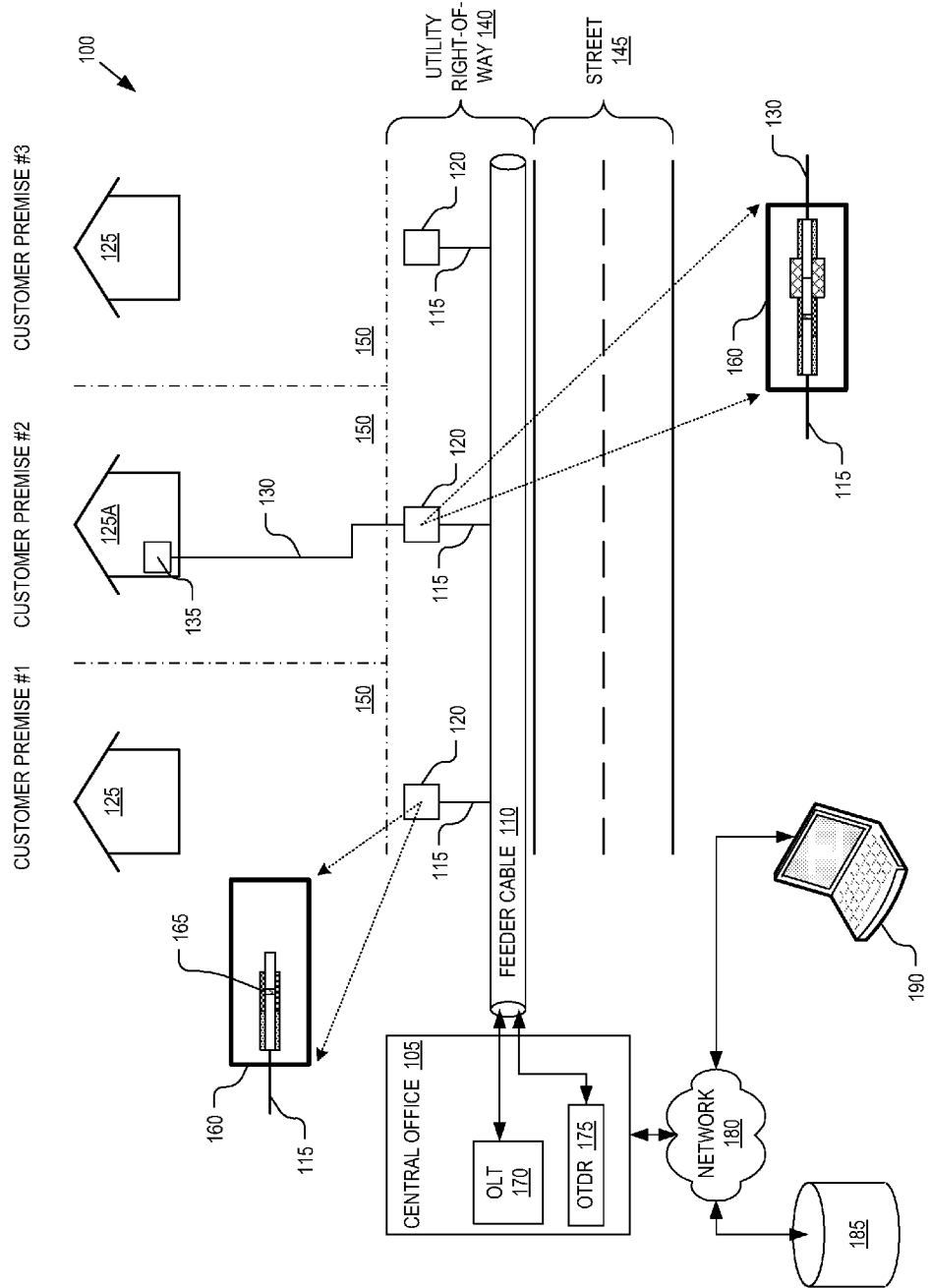
FIG. 1 is a functional block diagram illustrating a fiber optic network with feeder cable and access stub line plants, in accordance with an embodiment of the invention.

FIG. 1 is a functional block diagram illustrating a fiber optic network 100 with feeder cable and access stub line plants, in accordance with an embodiment of the invention. The illustrated embodiment of fiber optic network 100 includes a central office ("CO") 105, a feeder cable 110, access stub lines 115, and initial termination points 120. For those customer premises 125 that have connected to fiber optic network 100 (e.g., customer premise 125A), a fiber access line 130 connects the initial termination point 120 to a secondary termination point 135 on the customer premise 125A.

In one embodiment, fiber optic network 100 is a passive optical network ("PON"). In the PON embodiment, feeder cable 110 includes a fiber feeder line that couples to each of the access stub lines 115 using optical splitters. Of course, feeder cable 110 may include many fiber feeder lines that each carries communication services to a different set of customer premises (e.g., 32-128 customer premises per feeder fiber inside the feeder cable).

In another embodiment, fiber optic network 100 has a point-to-point architecture ("pt-2-pt") as opposed to PON's point-to-multipoint architecture. In a pt-2-pt architecture, feeder cable 110 includes a dedicated homerun fiber per customer premise 125 that extends all the way from CO 105 to each customer premise 125. In the pt-2-pt architecture, access stub lines 115 are each that portion of a given continuous homerun fiber that exits feeder cable 110 and extends towards the given initial termination point 120. In the PON architecture, access stub lines 115 are distinct fiber runs that couple between an optical splitter at feeder cable 110 and the associated initial termination point 120.

In the illustrated embodiment, feeder cable 110 extends from CO 105 into a neighborhood of customer premises 125, which represent potential or existing customers of the service provider. Feeder cable 110 may run along a utility right-of-way 140 running adjacent to a neighborhood street 145 that passes by customer premises 125. Access stub lines 115 extend from feeder cable 110 within the physical site of utility right-of-way 140 and terminate at initial termination points 120, also within utility right-of-way 140. Initial termination points 120 will typically be positioned adjacent to the property 150 of each customer premise 125, but within utility right-of-way 140, since the operator many not have permission to run a fiber plant onto properties 150. In one embodiment, there is a one-to-one correspondence between customer premises 125 and the initial termination points 120 and access stub lines 115. Feeder cable 110 may be a subterranean fiber plant, a suspended fiber plant (e.g., suspended along telephone poles), or otherwise.

Figure 2:
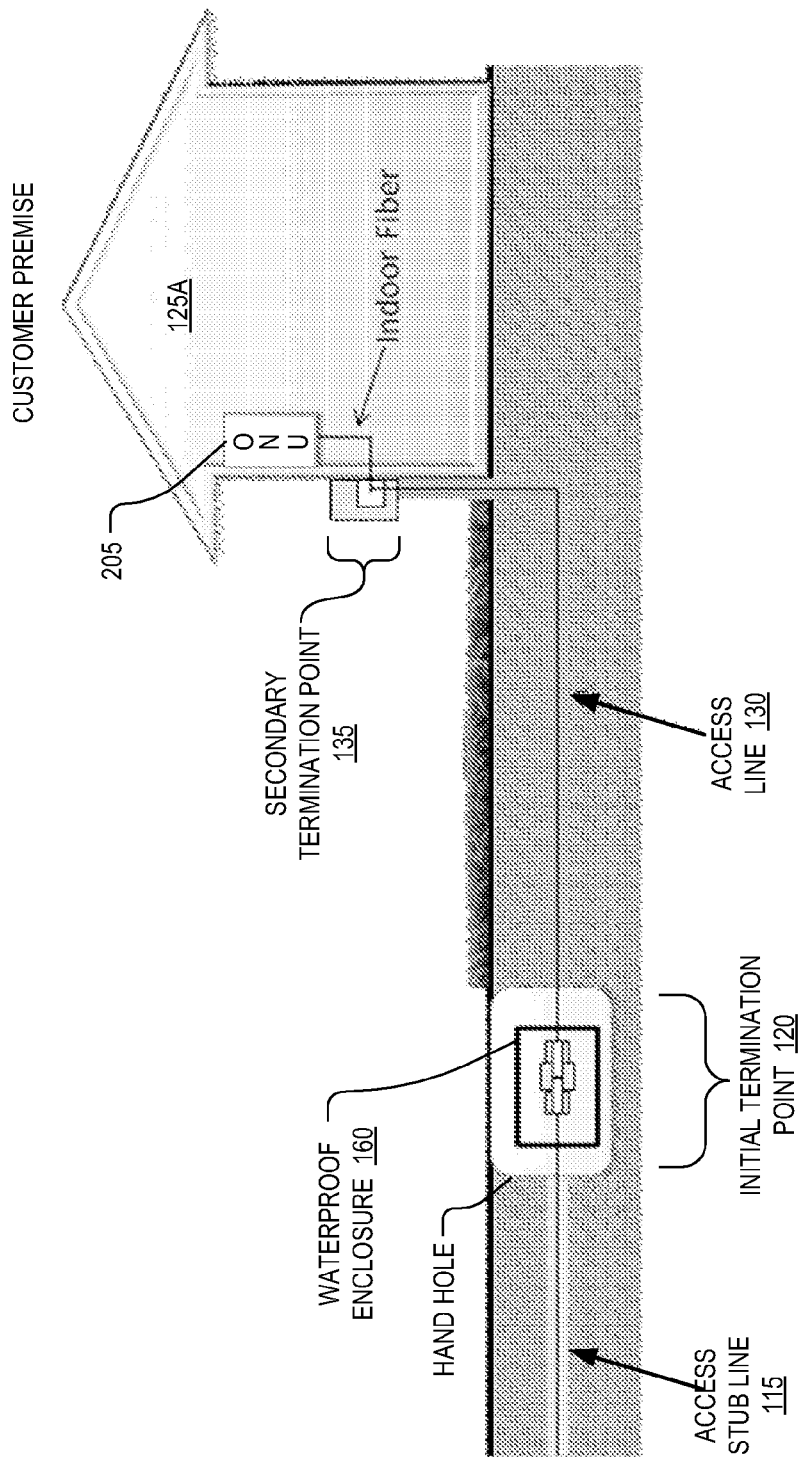
FIG. 2 is a cross-sectional block diagram illustrating installation of the last segment fiber access line from an initial termination point to a secondary termination point, in accordance with an embodiment of the invention.

The initial termination points 120 mark the terminating points of the initial fiber plant where each access stub line 115 ends. Each initial termination point 120 may be a hand hole recessed into the ground (e.g., see FIG. 2) or an above ground service box, such as a pole or post mounted box (not illustrated). In one embodiment, the hand hole may include a lock box that requires a specialized keyed wrench to open, which operates as a barrier to malicious mischief. The initial termination point 120 also includes a waterproof enclosure 160 (also referred to as a weather hardened enclosure) that includes fiber connectors and a demarcation device 165 (described in greater detail below in connection with FIGS. 3A-3D). Demarcation device 165 operates to reflect an optical test signal used for testing the integrity of the fiber plant. In one embodiment, demarcation device 165 is both reflective to the optical test signal and transmissive to the optical data signals delivering the communication services to customer premises 125. In one embodiment, the optical test signal is an optical time-domain reflectometry ("OTDR") diagnostic signal launched from CO 105 down feeder cable 110 after the initial fiber plant of feeder cable 110 and access stub lines 115 to generate a reference reflection signature also referred to as an OTDR trace (discussed in great detail below in connection with FIG. 6). The reference reflection signature may be referenced against subsequent reflection signatures obtained after a network fault has occurred to aid in fault location identification.

The embodiment of FIG. 1 illustrates the CO 105 located at the head end ("HE") of a PON. CO 105 includes an optical line terminal ("OLT") 170 and an OTDR transceiver 175. OLT 170 is an optical transceiver that communicates with optical network units ("ONUs") 205 (shown in FIG. 2) within customer premises 125 and provides the communication services to the end users. The OLT 170 functions as a service distribution entity for distributing communication servers to the end users at ONUs 205. The OLT 170 generates "downstream" optical communication service signals to the ONUs 205 and receives "upstream" optical communication signals from the ONUs 205. The ONUs 205, sometimes also known as optical network terminals ("ONTs"), constitute part of the customer premise equipment ("CPE") and convert data signals between the optical realm and the electrical realm. Optical communications between OLT 170 and ONUs 205 are carried by light at one or more optical wavelengths. Time division multiplexing ("TDM"), wavelength division multiplexing ("WDM"), and/or encryption protocols can be used to share OLT transceiver 170 with multiple ONUs 205. For example, the same fiber path, e.g., the feeder fiber line within feeder cable 110 and a respective fiber access line 130, is used to carry both an upstream optical communication signal from a respective ONU 205 to the shared OLT 170 and a downstream optical communication service signal from the shared OLT 170 to the ONUs 205 by using different optical wavelengths for the upstream and downstream optical signals and encryption protocols on the downstream optical signals. In some implementations of the system in FIG. 1, for example, the optical wavelength at 1310 nm can be used for the upstream transmission and the optical wavelength at 1490 nm can be used for the downstream transmission. Of course, the pt-2-pt architecture will use different protocols and may employ a dedicated OLT at central office 105 for each ONU 205.

Fiber optic network 100 may further include diagnostic equipment for identifying and locating fiber faults (e.g., breaks, kinks, etc.) in the fiber plant. This diagnostic equipment may include a network 180, a database 185, and an interface computing device 190. The interface computing device 190 may be a portable computer taken on-site with a technician during repair service calls and can remotely communication with CO 105 or database 185 via network 180. Through interface computing device 190, a technician can instruct OTDR transceiver 175 to launch a optical test signal into the HE of feeder cable 110, retrieve real-time results from the test (e.g., a reflection signature or OTDR trace), access database 185 to retrieve a reference reflection signature, compare the current reflection signature against the reference reflection signature to identify a location of the fault through a computing algorithm, map the location, and even communicate with OLT 170 to identify the specific ONU which has lost communication due to the network fault. Greater details of the operation of OTDR transceiver 175 are discussed below in connection with FIG. 6.

FIGS. 3A-D are functional block diagrams illustrating various configurations of waterproof enclosures including an optical demarcation device, in accordance with an embodiment of the invention. These waterproof enclosures can serve to terminate the end of access stub lines 115 at each initial termination point 120 or serve to terminate the end of fiber access lines 130 at secondary termination point 135 once a customer has connected to fiber optic network 100.

Figure 3A:
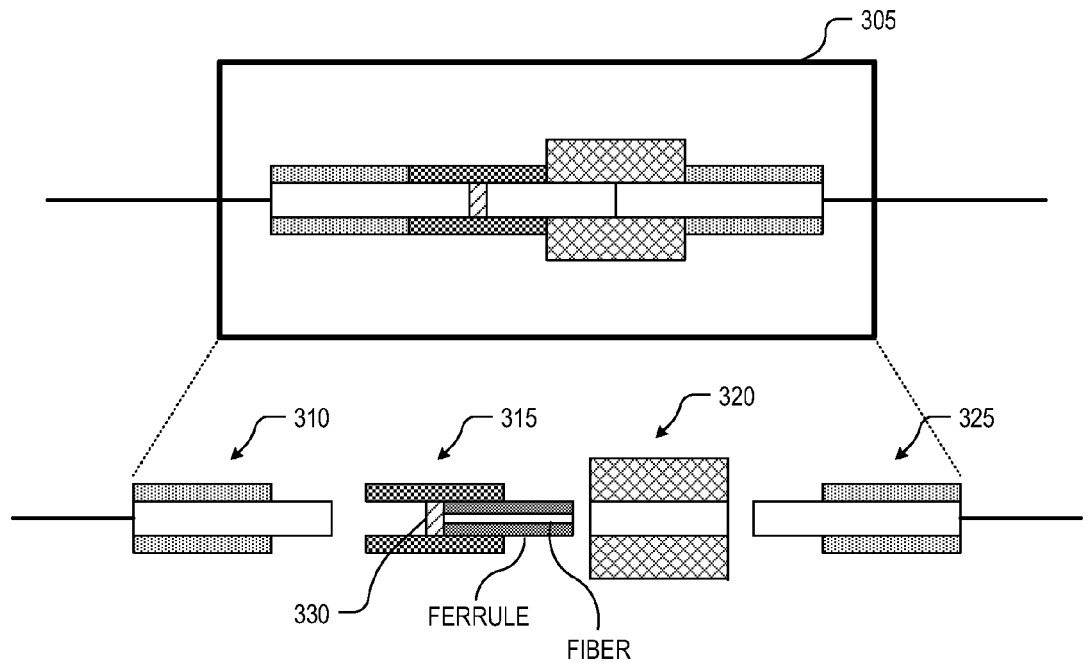
FIGS. 3A-D are functional block diagrams illustrating various configurations of waterproof enclosures including an optical demarcation device of a termination point, in accordance with an embodiment of the invention.

FIG. 3A illustrates a waterproof enclosure 305, in accordance with an embodiment of the invention. Waterproof enclosure 305 is one possible implementation of waterproof enclosures 160 illustrated in FIG. 1. The illustrated embodiment of waterproof enclosure 305 includes an upstream fiber connector 310, a demarcation device 315, a fiber connector adaptor 320, and a downstream fiber connector 325. Of course, if waterproof enclosure 305 is installed within an initial termination point 120 corresponding to a customer premise 125 that has not installed fiber access line 130, then downstream fiber connector 325 will not be present and in some cases fiber connector adaptor 320 will also not be present. In some embodiments, a sealed end cap may be placed over the exposed end of demarcation device 315 or fiber connector adaptor 320.

In one embodiment, waterproof enclosure 305 is a form-fitted outer jacket or sleeve that protects the inner components. For example, waterproof enclosure 305 may be rubberized, plastic, or even ceramic jacket. In another embodiment, waterproof enclosure 305 is a distinct rigid box enclosure into which the inner components are inserted. In either configuration, waterproof enclosure 305 is a weather hardened structure that keeps the inner components dry and protected from weather related and environmental stresses.

The illustrated embodiment of demarcation device 315 is a female-to-male adaptor with an embedded optical reflector 330 positioned in the optical path. The male portion of demarcation device 315 includes a ferrule for clamping or crimping around an optical fiber. The optical reflector 330 may be implemented as a thin film multi-layer filter that reflects the optical test signal (e.g., reflects 1610 to 1650 nm wavelengths), while substantially transmissive to other wavelengths (e.g., 1310 and 1490 nm wavelengths used for upstream and downstream data and other future signal wavelengths for possible service expansion and upgrade). Optical reflector 330 may also represent or demark the end of the service provider's fiber optic network 100.

Figure 3B:
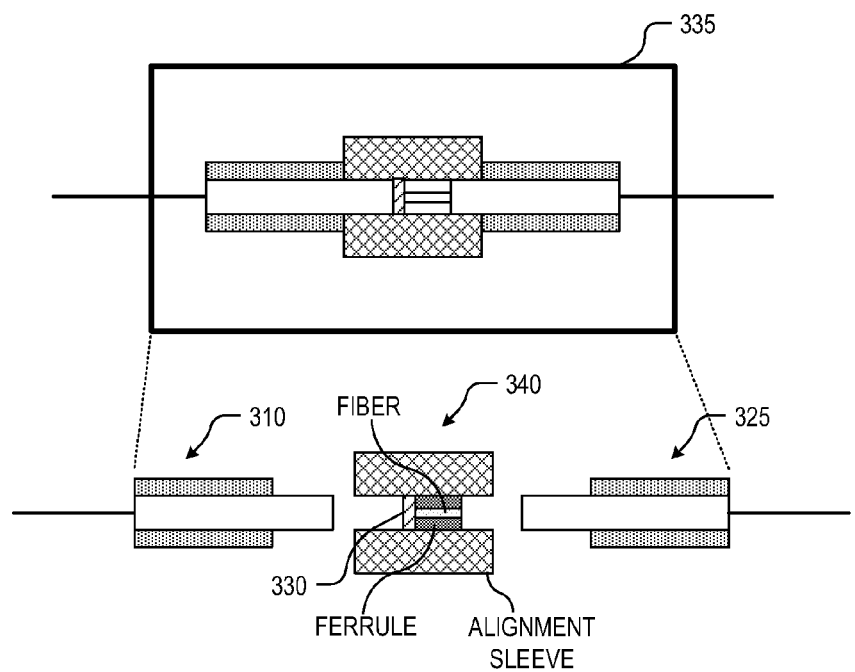

FIG. 3B illustrates a waterproof enclosure 335, in accordance with an embodiment of the invention. Waterproof enclosure 335 is one possible implementation of waterproof enclosures 160 illustrated in FIG. 1 and is similar to waterproof enclosure 305, except that demarcation device 340 is included within a female-to-female adaptor reducing the number of inner components and obviating the need for an additional female-to-male adaptor. Demarcation device 340 includes optical filter 330 embedded in an alignment sleeve adjacent to a ferrule in the optical path.

Figure 3C:
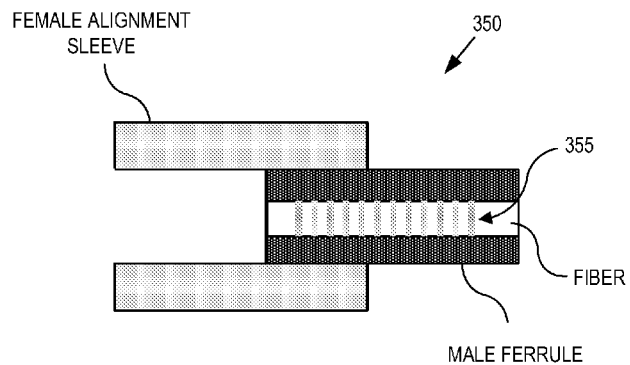

FIG. 3C illustrates an alternative demarcation device 350 that could be used within waterproof enclosure 305 instead of demarcation device 315, in accordance with an embodiment of the invention. Demarcation device 350 is similar to demarcation device 315 but instead of a thin film multi-layer filter, a fiber Bragg grating 355 is fabricated into the optical path within a length of fiber to operate as the wavelength selective optical reflector. In one embodiment, fiber Bragg grating 355 is implemented as a doped grating region.

Figure 3D:
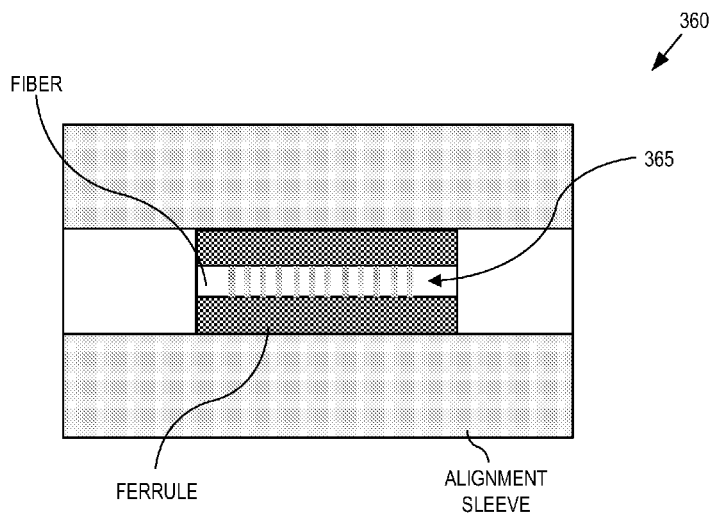

FIG. 3D illustrates an alternative demarcation device 360 that could be used within waterproof enclosure 335 instead of demarcation device 340, in accordance with an embodiment of the invention. Demarcation device 360 is similar to demarcation device 340 but instead of a thin film multi-layer filter, a fiber Bragg grating 365 is fabricated into the optical path within a length of fiber to operate as the wavelength selective optical reflector. In one embodiment, fiber Bragg grating 365 is implemented as a doped grating region.

It should be appreciated that waterproof enclosure 160 and optical demarcation device 165 may take on a variety of other shapes and configurations than those illustrated in FIGS. 3A-3D. For example, the internal components of waterproof enclosure 160 may include two, three, or four separate pieces or two monolithic structures that may clip, thread, or otherwise connect to each other in a weatherproof structure. In another alternative embodiment, demarcation device 165 may be incorporated into a screw cap or bayonet fitting.

Figure 4:
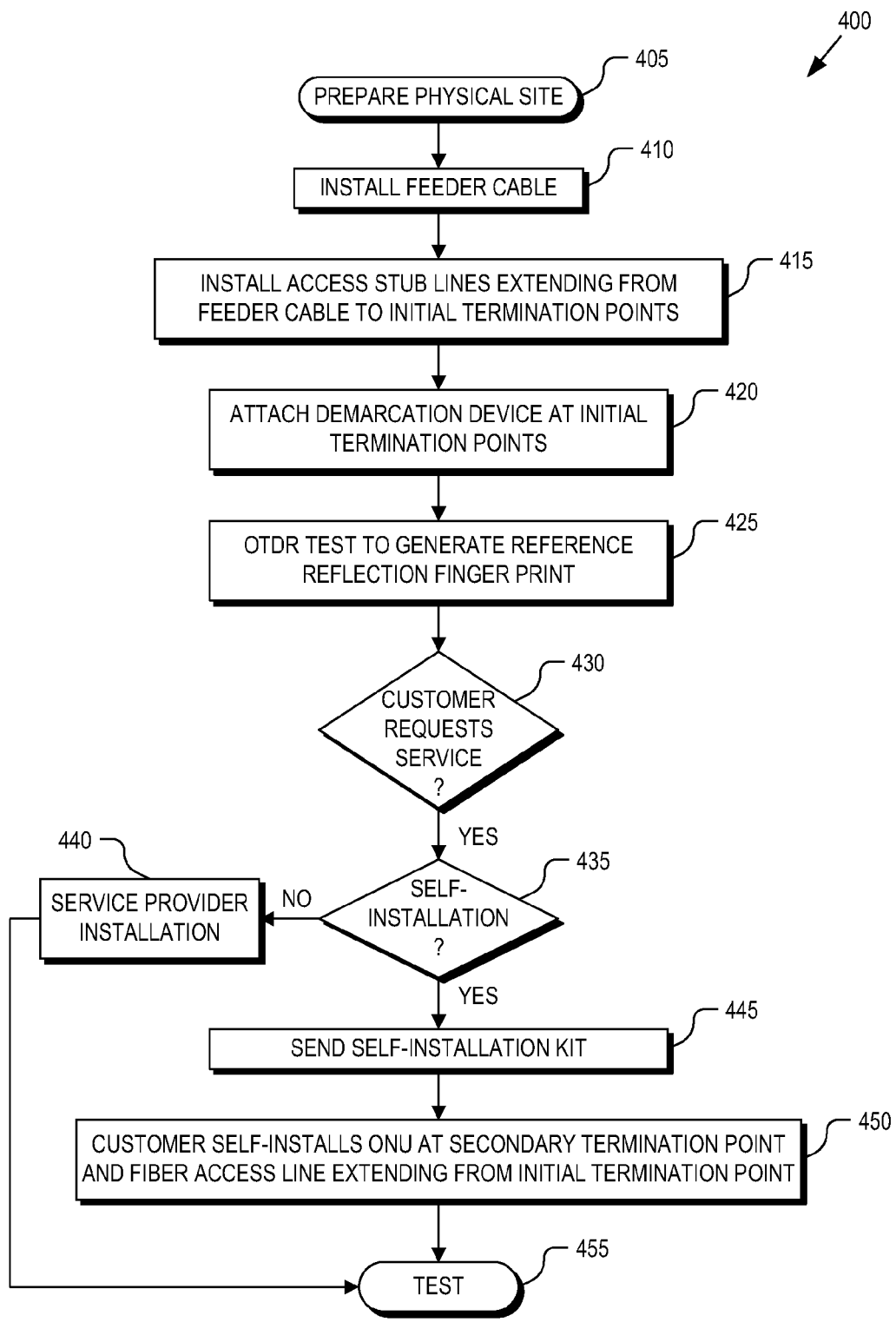
FIG. 4 is a flow chart illustrating a process for installation of a fiber optic network, in accordance with an embodiment of the invention.

FIG. 4 is a flow chart illustrating a process 400 for installation of fiber optic network 100, in accordance with an embodiment of the invention. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 405, the physical site for the future fiber plant is prepared. The physical site may extend from CO 105 into a neighborhood designated to receive fiber optic communication services. Physical site preparation includes preparing the physical premises to accept one access stub line 115 and one initial termination point 120 per customer premise 125, whether or not pre-orders for service have been received for a given customer premise 125. In other words, the physical site is prepared in advance such that each fiber optic network 100 is stubbed out for each customer premise 125, whether or not a particular customer premise has ordered communication services from the service provider.

In the case of a below-ground fiber plant, preparing the physical site may include trenching a ditch for feeder cable 110, access stub lines 115, and initial termination points 120 within utility right-of-way 140. In the case of an above-ground feeder cable 110, but below-ground access stub lines 115 and initial termination points 120, then preparation of the physical site may include trenching the ditch for the access stub lines 115 and initial termination points 120, but preparing the posts or poles for feeder cable 110. Preparation of the physical site may also include burying the lock boxes within hand holes at each initial termination point 120.

Once the physical site has been prepared, feeder cable 110 may be planted (process block 410) and access stub lines 115 extended from feeder cable 110 into the individual initial termination points 120 associated with each customer premise 125 (process block 415). In the case of a PON, extending access stub lines 115 may include using optical splitters to tap off of a main feeder line within feeder cable 110. In the case of a pt-2-pt fiber optic network, extending access stub lines 115 may include drawing out a single fiber line from feeder cable 110 in front of each property 150 and routing the single fiber line into a corresponding initial termination point 120.

In a process block 420, waterproof enclosures 160, each including a demarcation device 165, are attached to the end of each access stub line 115 within initial termination points 120. Once the demarcation devices 165 have been installed, OTDR testing can be executed to test the integrity of the initial feeder cable and access stub line deployments. The OTDR test includes launching an optical test signal from the HE down feeder cable 110 towards the newly planted access stub lines 115. The optical reflectors within each demarcation device 165 are specifically designed to reflect the wavelength of the optical test signal back towards CO 105 where it is picked up and analyzed by OTDR transceiver 175. The reflection signature can be analyzed to validate the installation and determine if there are any breaks in the fibers, and if determined to be good, then stored as a reference reflection finger print for future comparisons.

Subsequent to the initial fiber plant of feeder cable 110 and access stub lines 115, individual customers may be notified by the service provider of the availability of the new communication services in their neighborhood. As customers request service (decision block 430), the service provider can give the customer the option (decision block 435) between a professional installation of the final length of fiber (i.e., fiber access line 130) and the ONU at the secondary termination point 135 (process block 440), or self-installation of this final length of fiber and the ONU.

If the customer opts for self-installation, then the service provide sends a self-installation kit to the requesting customer (process block 445). This self-installation kit includes instructions and installation hardware to facilitate the customer self-installation. Self-installation provides the customer with the option of installing the ONU at secondary termination point 135 and routing the fiber access line 130 in the locations of their choosing, while saving on labor costs (process block 450).

In one embodiment, the self-installation kit includes a fiber extension line and conduit for planting fiber access line 130, a bend elbow for mechanically limiting the bending radius when routing the fiber through the exterior wall of the customer premise, a wall plate for mounting the ONU on an inside wall of the customer premise, ONU 205 itself, a keyed wrench for opening the lock box at the initial termination point 120, and one or more fiber connectors. Of course, it should be appreciated that various embodiments of the self-installation kit may omit various items mentioned above, or include other hardware items or tools not mentioned above to facilitate the customer's self-installation of fiber access line 130 and the ONU at secondary termination point 135.

Figure 5A:
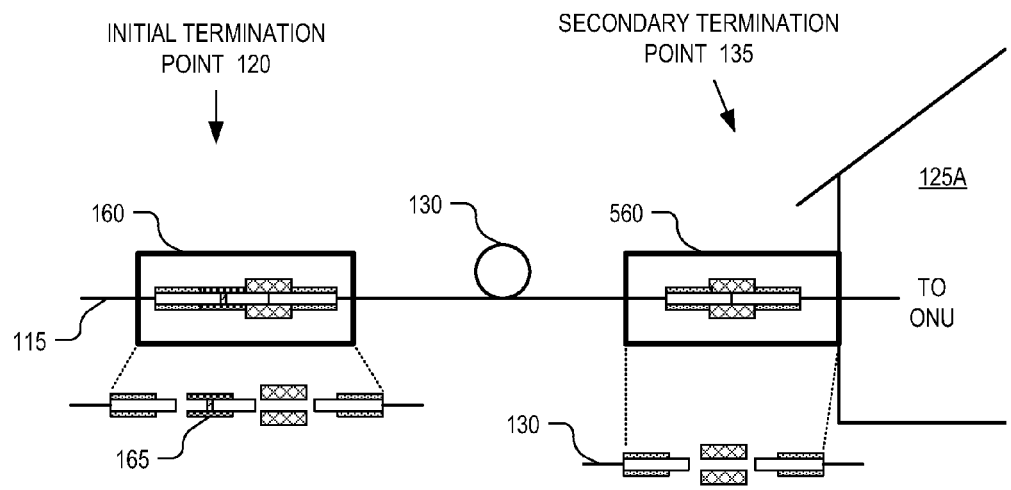
FIGS. 5A and 5B are functional block diagrams illustrating the installation of the secondary termination point at the customer premise, in accordance with an embodiment of the invention.

For example, in one embodiment, the self-installation kit may include an additional waterproof enclosure 560 for coupling to the customer premise side of fiber access line 130 (see FIG. 5A). In the embodiment of FIG. 5A, demarcation device 165 remains installed at initial termination point 120 and no demarcation device 165 is added to secondary termination point 135. In this embodiment, the optical test signal is reflected at initial termination point 120 and therefore blocked from propagating down fiber access line 130. Thus, the embodiment illustrated in FIG. 5A is not capable of performing OTDR testing from CO 105 all the way to secondary termination point 135 including fiber access line 130. However, this will typically be a relatively short length of line.

Figure 5B:
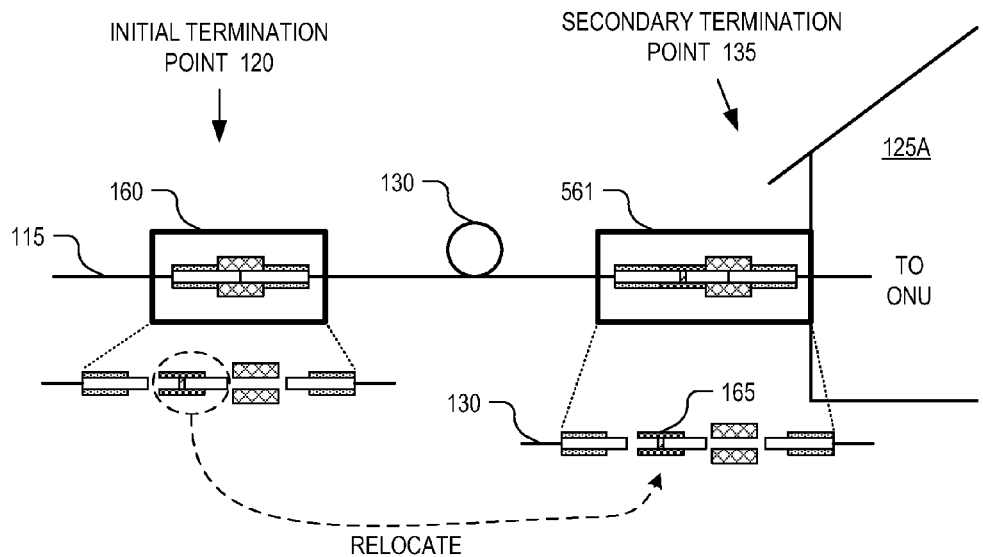

Alternatively, the self-installation kit may include instructions to relocate demarcation device 165 from initial termination point 120 to the secondary termination point 135 by disconnecting it from waterproof enclosure 160 and inserting it in line at waterproof enclosure 561 at the secondary termination point 135 (FIG. 5B). Of course, demarcation device 165 could be mounted inline on the inside of the customer premise 125, in which case waterproof enclosure 561 may not be used. Furthermore, demarcation device 165 may simply be discarded and a new demarcation device may be provided with the ONU for installation at secondary termination point 135. In the embodiment illustrated in FIG. 5B, OTDR testing from CO 105 right up to secondary termination point 135 including fiber access line 130 can be performed, thus helping the operator to verify the success of last segment fiber installation.

Once the ONU has been installed at secondary termination point 135 on the customer premise, the line may be tested. This test may include a communication test between the newly installed ONU 205 and OLT 170 at CO 105. This test may further include executing another OTDR test to obtain a new reference reflection signature that includes the extension fiber access line 130, if the demarcation device is removed from initial termination point 120.

Figure 6A:
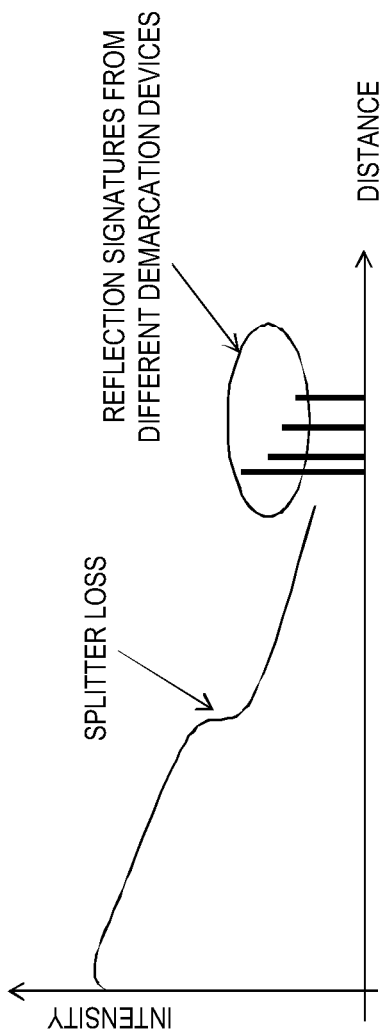
FIGS. 6A and 6B include charts illustrating demonstrative operation of an optical time-domain reflectometry ("OTDR") diagnostic process, in accordance with an embodiment of the invention.

OTDR testing may begin by obtaining a reference OTDR signature as well as other network parameters. Upon the initial deployment of the fiber optic network 100, the OTDR test signal is shot from CO 105 towards all customer premises 125 to obtain the reference OTDR signature pattern. The reference OTDR signature may also be obtained during network maintenance time. At each demarcation device, the OTDR signal is reflected by the optical reflector within demarcation devices 165. Multiple reflections at different intensities and distances may be observed by OTDR transceiver 175, as shown in FIG. 6A, which is typical of a PON system. As a result, the aggregate of all the reflections from all the demarcation devices form a reflection signature. Therefore, fiber optic network 100 is associated with a reflection pattern with signature peaks corresponding to the demarcation locations.

In the case of a PON, when an OTDR test signal is shot from the HE towards the demarcation devices 165 through a remote splitting node (e.g., optical splitter), a signal drop due to the splitting loss may be recorded in the OTDR reflection signature. FIG. 6A illustrates only one splitter loss. When a series of cascaded splitters are present, multiple drops will be recorded in the OTDR test signature.

Figure 6B:
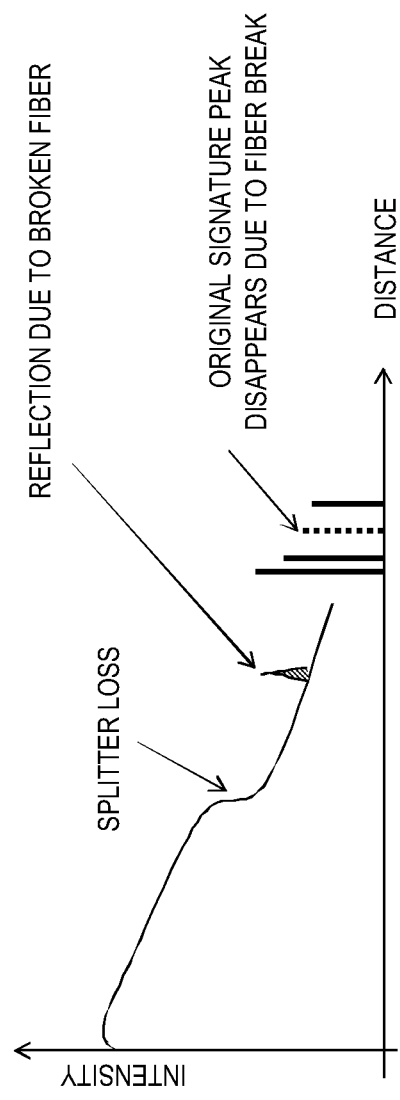

The reference reflection signature obtained during the initial test and the associated fiber plant data may be stored in database 185 and integrated with a web-based map. In other words, the reference reflection signature may be correlated with map data and viewed through a graphical interface. When a user looses service, the system receives an outage indication from CO 105. An in-service OTDR test may then be performed by launching another OTDR optical test signal at the CO/HE and recording the reflected signatures. If a distribution fiber is broken, the reflection peak corresponding to the associated demarcation device disappears from the reference reflection signature. Instead, a new reflection peak appears at the break location due to the glass or air discontinuity at the break point, as shown in FIG. 6B. The new reflection signature can then be analyzed against the reference reflection signature. With the knowledge of other associated fiber plant data, such as which ONU has lost service, the fiber fault location can then be located on a map.

Some of the process blocks explained above may be described in terms of computer software and hardware. The techniques described may constitute machine-executable instructions embodied within a machine (e.g., computer) readable storage medium, that when executed by a machine will cause the machine to perform the operations described. Additionally, the process operations may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of installing a fiber optic network, the method comprising:

preparing a physical site to accept a feeder cable and a plurality of access stub lines of the fiber optic network, the physical site extending along a plurality of customer premises that potentially may connect to the feeder cable to obtain communication services via the fiber optic network;

installing the feeder cable at the physical site and coupling the feeder cable at a head end to a central office that provides access to the communication services;

installing access stub lines extending from the feeder cable towards the customer premises and each ending at a different initial termination point, wherein there is a one-to-one correspondence between the customer premises and the access stub lines extending from the feeder cable, wherein the initial termination points are exterior to the customer premises and are not initially connected to customer premise equipment ("CPE") until a fiber access line is extended between a given initial termination point and a given secondary termination point on a given customer premise; and attaching a demarcation device to an end of each of the access stub lines at each of the initial termination points, the demarcation device including an optical reflector that is reflective to an optical test signal for testing integrity of the feeder cable and an associated one of the access stub lines.

2. The method of claim 1, wherein each of the demarcation devices is included within a waterproof enclosure positioned at an associated one of the initial termination points.

3. The method of claim 2, wherein the initial termination points comprise lock boxes within which the waterproof enclosures are positioned.

4. The method of claim 3, wherein preparing the physical site includes:
digging hand holes at the initial termination points recessed into ground adjacent to the plurality of customer premises; and
placing the lock boxes into the hand holes.

5. The method of claim 2, wherein the optical reflector is reflective to the optical test signal but transmissive to optical data signals that carrier customer traffic communicated over the fiber optic network.

6. The method of claim 5, wherein the demarcation device comprises:
an alignment sleeve;
a ferrule disposed at least partially within the alignment sleeve; and
the optical reflector disposed within the alignment sleeve.

7. The method of claim 5, wherein the optical reflector comprises one of a thin film multi-layer filter or a fiber Bragg grating.

8. The method of claim 1, further comprising:
receiving a request from a customer for installation of the fiber access line extending from one of the initial termination points to provide the customer access to the communication services delivered over the fiber optic network; and
providing the customer a self-installation kit to enable the customer to self-install a secondary termination point on the customer premise of the customer and the fiber access line extending from the one of the initial termination points to the secondary termination point.

9. The method of claim 8, wherein the self-installation kit includes:
a fiber extension line for linking the one of the initial termination points to the secondary termination point as the fiber access line;
an optical network unit ("ONU") for converting the communication services between an optical realm and an electrical realm; and
mounting hardware for mounting the ONU to a wall of the customer premise of the customer.

10. The method of claim 9, wherein the self-installation kit includes a secondary demarcation device for coupling between the ONU and the fiber access line, the secondary demarcation device including a second optical reflector that is reflective to the optical test signal for testing integrity of the feeder cable, the fiber access line, and the associated one of the access stub lines after removal of the demarcation device in the one of the initial termination point.

11. The method of claim 9, wherein the demarcation device is re-locatable from the one of the initial termination points to the second termination point.

12. The method of claim 1, further comprising:
launching the optical test signal from the head end of the feeder cable towards the plurality of access stub lines after installation of the feeder cable and the access stub lines;
recording a reflection of the optical test signal from the demarcation devices attached to the ends of access stub lines;
generating a reflection signature based on the reflection; and
determining integrity of the feeder cable and the access stub lines based on the reflection signature.

13. The method of claim 1, wherein the fiber optic network comprises a passive optical network ("PON") and the access stub lines each splice into a single fiber optic feeder line within the feeder cable through an optical power splitter.

14. The method of claim 1, wherein the fiber optic network comprise a point-to-point optical network, wherein the feeder cable includes a plurality of fiber optic feeder lines, wherein the each of the access stub lines extends from a corresponding one of the fiber optic feeder lines.

15. A method of installing a fiber optic network, the method comprising:
installing a feeder cable within a right of way running along a street that passes by a plurality of customer premises that potentially may connect to the feeder cable to obtain communication services via the fiber optic network, the feeder cable having a first end to couple to a central office that provides access to the communication services;
installing access stub lines extending from the feeder cable towards the property of the customer premises and each ending at a different initial termination point;
attaching a demarcation device to an end of each of the access stub lines at each of the initial termination points, the demarcation device including an optical reflector that is reflective to an optical test signal for testing integrity of the feeder cable and an associated one of the access stub lines;
receiving a request from a customer for installation of an access line extending from one of the initial termination points to provide the customer access to the communication services delivered over the fiber optic network; and
providing the customer a self-installation kit to enable the customer to self-install a secondary termination point on the customer premise of the customer and to self-install the access line extending from the one of the initial termination points to the secondary termination point on the customer premise of the customer.

16. The method of claim 15, wherein demarcation device is included within a waterproof enclosure, the method further comprising:
placing the waterproof enclosure of each of the access stub lines into a hand hole recessed into ground and each located at one of the initial termination points.

17. The method of claim 15, wherein there is a one-to-one correspondence between the customer premises and the access stub lines extending from the feeder cable.

18. A fiber optic network, comprising:
a central office including an optical line terminal ("OLT") that provides access to communication services;

an optical feeder cable extending from the OLT of the central office into a neighborhood including a plurality of customer premises;

initial termination points each positioned adjacent to a corresponding one of the customer premises, wherein there is a one-to-one correspondence between the initial termination points and the customer premises; and access stub lines each extending from the optical feeder cable to a corresponding one of the initial termination points;

wherein a first group of the customer premises each include an optical network unit ("ONU") coupled to a corresponding one of the initial termination points via a fiber access line, wherein the initial termination points adjacent to a second group of the customer premises that have not enrolled to receive the communication services via the fiber optic network each include a demarcation device with an optical reflector that is reflective to an optical test signal for testing integrity of the feeder cable and an associated one of the access stub lines.

19. The fiber optic network of claim 18, wherein each of the demarcation devices is included within a waterproof enclosure positioned at an associated one of the initial termination points.

20. The fiber optic network of claim 19, wherein each of the demarcation devices comprises:
   an alignment sleeve;
   a ferrule disposed at least partially within the alignment sleeve; and
   the optical reflector disposed within the alignment sleeve.

21. The fiber optic network of claim 20, wherein the optical reflector comprises one of a thin film multi-layer filter or a fiber Bragg grating.

* * * * *